US008862349B2

(12) United States Patent
Faucett et al.

(10) Patent No.: US 8,862,349 B2
(45) Date of Patent: Oct. 14, 2014

(54) INTEGRATED TRANSMISSION AND AUXILIARY GEARBOX CONTROL (75) Inventors: Bruce Faucett, Brownsburg, IN (US); Robert F. Combs, Mulberry, IN (US); Leroy K. Johnson, Brownsburg, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 892 days.

(21) Appl. No.: 12/917,600

(22) Filed: Nov. 2, 2010

(65) Prior Publication Data

US 2011/0224877 A1    Sep. 15, 2011

Related U.S. Application Data (60) Provisional application No. 61/312,005, filed on Mar. 9, 2010.

(51) Int. Cl.
*G06F 7/00* (2006.01)
*F16H 61/02* (2006.01)
*F16H 61/70* (2006.01)
*F16H 59/38* (2006.01)

(52) U.S. Cl.
CPC .......... *F16H 61/702* (2013.01); *F16H 61/0213* (2013.01); *F16H 59/38* (2013.01)
USPC .......................................................... 701/56

(58) Field of Classification Search
None
See application file for complete search history.

(56) References Cited

U.S. PATENT DOCUMENTS

| 4,850,236 | A |   | 7/1989  | Braun |
|-----------|---|---|---------|-------|
| 5,390,561 | A |   | 2/1995  | Stine |
| 5,522,777 | A |   | 6/1996  | Baxter et al. |
| 5,601,506 | A |   | 2/1997  | Long et al. |
| 6,007,455 | A |   | 12/1999 | Steeby |
| 6,092,433 | A |   | 7/2000  | Rose et al. |
| 6,165,103 | A | * | 12/2000 | Tenzor et al. ................. 477/127 |
| 6,327,529 | B1|   | 12/2001 | Ore |
| 7,343,236 | B2|   | 3/2008  | Wilson |
| 7,413,525 | B2|   | 8/2008  | Breen |
| 2003/0114261 | A1 | | 6/2003 | Moorman et al. |
| 2010/0010717 | A1 | | 1/2010 | Maeda |
| 2010/0044140 | A1 | | 2/2010 | Shultz et al. |

OTHER PUBLICATIONS

The International Search Report and the Written Opinion for PCT/US2011/023105, dated Mar. 29, 2011, 9 pages.

* cited by examiner

*Primary Examiner* — Thomas Tarcza
*Assistant Examiner* — Garrett Evans
(74) *Attorney, Agent, or Firm* — Barnes & Thornburg LLP (57) ABSTRACT A powertrain of a vehicle has a drive unit, a transmission and an auxiliary gearbox. Operation of the transmission and the auxiliary gearbox is controlled by a transmission control unit. The transmission control unit controls shifting of the auxiliary gearbox and the transmission while the vehicle is in operation. The auxiliary gearbox may be electronically shifted, independently of activity of the vehicle operator.

20 Claims, 3 Drawing Sheets

INTEGRATED TRANSMISSION AND AUXILIARY GEARBOX CONTROL

This application claims the benefit of U.S. Provisional Patent Application Ser. No. 61/312,005, filed Mar. 9, 2010, which is incorporated herein by reference in its entirety.

TECHNICAL FIELD

This disclosure relates generally to powered vehicle transmissions, and more particularly, to electronic controls for a vehicle powertrain having a power transmission and an auxiliary gearbox.

BACKGROUND

In powered vehicles, a transmission receives rotational speed and torque output by the vehicle's drive unit (e.g. engine) and adapts it to the vehicle's operating requirements. The output of the transmission drives the vehicle load (e.g. the drive wheels).

Some vehicles have an auxiliary gearbox (e.g. a transfer case or dropbox), which is coupled to the transmission output. The auxiliary gearbox may be used to provide additional mechanical ratio coverage, an overdrive, and/or alternate modes of operation (e.g. four-wheel drive or all-wheel drive). If the vehicle is equipped with a power take-off assembly (PTO), the auxiliary gearbox may be used to shift the vehicle into a mode in which an auxiliary device attached to the PTO can be operated. In such event, the auxiliary gearbox drives the operation of the auxiliary device. The auxiliary device may be, for example, a pump, mixer, lifter, shoveler, compressor, compactor, or blower, as may be provided with utility trucks such as fire trucks, tow trucks, dump trucks, cement mixers, and the like.

The vehicle operator initiates use or shifting of the auxiliary gearbox, using a mechanical, pneumatic, hydraulic, or electrical selector to select the desired alternate mode of operation. However, often, the alternate mode cannot be used unless the vehicle is stopped and/or the transmission is in a neutral range.

SUMMARY

According to one aspect of the present disclosure, a transmission assembly for a powered vehicle includes a transmission having first gearing and first selectively engageable torque transmitting mechanisms. The transmission assembly also includes an auxiliary gearbox coupled to the transmission. The auxiliary gearbox includes second gearing and second selectively engageable torque transmitting mechanisms. The transmission assembly also includes a first speed sensor coupled to the transmission, a second speed sensor coupled to the auxiliary gearbox, and a control unit coupled to the transmission. The control unit has memory, processor circuitry, and executable routines stored in memory to receive electronic signals from the first and second speed sensors, determine whether the transmission needs to be shifted, determine whether the auxiliary gearbox needs to be shifted, and send a shift command to the auxiliary gearbox while the vehicle is in operation, independently of activity of the vehicle operator.

The auxiliary gearbox may be mounted to the transmission. The transmission assembly may include a transmission output shaft having a first end and a second end spaced from the first end, where the first end is coupled to the transmission, and the auxiliary gearbox is coupled to the second end.

The transmission assembly may include a shift schedule stored in the memory, where the shift schedule indicates shift commands for the transmission and shift commands for the auxiliary gearbox. The shift schedule may indicate shift commands for a torque converter clutch.

The transmission assembly may include a first electro-hydraulic or pneumatic control system operably coupled to the transmission and a second electro-hydraulic or pneumatic control system operably coupled to the auxiliary gearbox. The control unit may send a first shift command to the first electro-hydraulic or pneumatic control system to shift the transmission, and send a second shift command to the second electro-hydraulic or pneumatic control system to shift the auxiliary gearbox. The transmission assembly may include a first supply of fluid coupled to the first electro-hydraulic or pneumatic control system and a second supply of electro-hydraulic fluid coupled to the second electro-hydraulic or pneumatic control system. The fluid may include air, transmission oil, and/or another hydraulic fluid. The vehicle's air supply may be part of the fluid supply.

According to another aspect of this disclosure, an electronic control for a transmission for a powered vehicle, where the transmission has an auxiliary gearbox coupled thereto, includes a housing mounted to the transmission, and a control unit embodied in the housing. The control unit has an interface, memory, processor circuitry, and a shift schedule stored in the memory. The shift schedule indicates shift commands for the transmission and shift commands for the auxiliary gearbox. The shift schedule may also indicate commands for the vehicle drive unit (e.g., the engine, hybrid system, or other power generation system). The control unit also has executable routines stored in the memory. The interface is configured to receive electrical inputs from the transmission and the auxiliary gearbox. The interface may also receive inputs from the vehicle drive unit. The processor circuitry is configured to execute the executable routines to determine a transmission range, issue an electrical transmission range command to the transmission, determine an auxiliary gearbox range, and issue an electrical auxiliary gearbox range command to the auxiliary gearbox while the vehicle is in operation, without initiation by the vehicle operator. The processor may also issue commands to the vehicle drive unit. The electronic control may include an electro-hydraulic and/or pneumatic control system configured to control application and release of hydraulically- and/or pneumatically-controlled components of the transmission and hydraulically-controlled components of the auxiliary gearbox, where the processor circuitry issues electrical signals to the electro-hydraulic control system to control the hydraulically-controlled components of the auxiliary gearbox.

Where the transmission has a number of selectable forward ranges and the auxiliary gearbox has at least one selectable low range and at least one selectable high range, the processor circuitry may execute an executable routine to permit an upshift in the transmission only when the auxiliary gearbox is in the high range. Where the transmission has a number of selectable forward ranges and the auxiliary gearbox has at least one selectable low range and at least one selectable high range, the processor circuitry may execute an executable routine to permit a downshift in the auxiliary gearbox only when the transmission is in a first forward range. Where the transmission has a number of selectable forward ranges and the auxiliary gearbox has at least one selectable low range and at least one selectable high range, the processor circuitry may execute an executable routine to permit shifting between the high and low ranges of the auxiliary gearbox when the transmission is in any of the forward ranges. Where the transmission has a number of selectable forward ranges and the auxiliary gearbox has at least one selectable low range and at least one selectable high range, the processor circuitry may execute an executable routine to permit the transmission to shift among the forward ranges when the auxiliary gearbox is in either a low range or a high range.

In accordance with another aspect of this disclosure, a method executable by an electronic control system mounted to a transmission of a powered vehicle while the vehicle is in operation includes receiving a transmission output speed signal from a first speed sensor coupled to the transmission, receiving an auxiliary gearbox output speed signal from a second speed sensor coupled to an auxiliary gearbox, the auxiliary gearbox being coupled to the transmission, determining a transmission range, issuing a transmission range command to the transmission to cause the transmission to attain the transmission range, determining an auxiliary gearbox range independently of activity of the vehicle operator, and issuing an auxiliary gearbox range command to the auxiliary gearbox to cause the auxiliary gearbox to attain the auxiliary gearbox range.

The method may include receiving a throttle signal from an electronic control unit mounted to a drive unit of the vehicle (e.g. an engine control unit or a vehicle control unit). The method may include determining a transmission range based on a current auxiliary gearbox range. The method may include determining an auxiliary gearbox range based on a current transmission range. The method may include determining whether to engage or release a torque converter clutch of the vehicle based on the auxiliary gearbox range. The method may include restricting shifting of the transmission based on a current auxiliary gearbox range.

BRIEF DESCRIPTION OF THE DRAWINGS

The detailed description refers to the following figures in which.

DETAILED DESCRIPTION

Aspects of the present invention are described with reference to certain illustrative embodiments shown in the accompanying drawings and described herein. While the present invention is described with reference to the illustrative embodiments, it should be understood that the present invention as claimed is not limited to the disclosed embodiments. For example, while certain aspects of this disclosure are discussed herein in the context of a an automatic transmission, it will be understood by those skilled in the art that aspects of the present disclosure are applicable to other types and configurations of transmissions, such as automated manual transmissions, electrically variable transmissions, hydraulically variable transmissions, or continuously variable transmissions.

Figure 1:
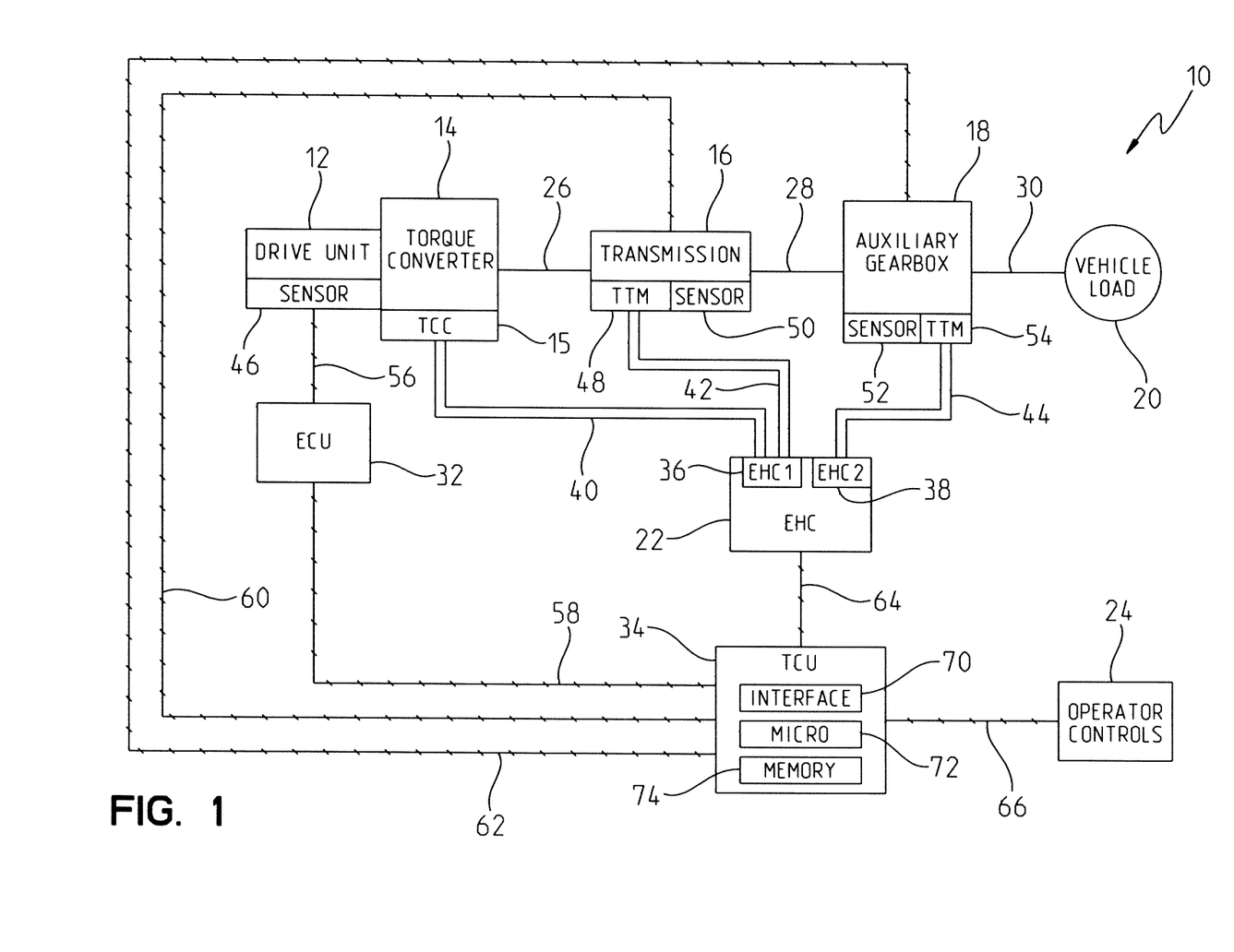
FIG. 1 is a block diagram showing a transmission control unit in the context of an exemplary vehicle powertrain including an auxiliary gearbox.

Referring to FIG. 1, a transmission control unit 34 is shown in the context of an exemplary vehicle powertrain 10. The powertrain 10 includes a transmission 16 and an auxiliary gearbox 18. The transmission control unit 34 provides integrated electronic control of the transmission 16 and the auxiliary gearbox 18, as described below.

As illustrated, the powertrain 10 also includes a drive unit 12 and a torque converter 14. The drive unit 12 may be an internal combustion engine of a compression-ignition type (i.e. diesel) or a spark-ignition type (i.e. gasoline), a hybrid or engine-electric motor combination, or another source of rotational energy. The drive unit 12 outputs torque to the torque converter 14. An electronic control unit 32 controls the operation of electronically-controlled components of the drive unit 12 (such as a fuel injector and various sensors). The electronic control unit 32 is also in electrical communication with the transmission control unit 34, as described below.

The torque converter 14 selectively establishes a coupling between the drive unit 12 and the transmission 16 to convert and/or transfer torque output by the drive unit 12 to the transmission 16. Torque converters typically include a torque converter pump, turbine, and stator (not shown), as is well known. In some embodiments, a torque converter clutch 15 is provided. The torque converter clutch 15 can be actuated to effect a mechanical coupling between the torque converter pump and turbine, using existing or newly discovered methods, devices or techniques.

In some embodiments of the powertrain 10, the torque converter 14 may be eliminated, or replaced with another form of torque transferring apparatus. For example, some versions of the powertrain 10 may include a ratio-varying unit, such as a toroidal traction type variator, rather than a torque converter.

A transmission input shaft 26 connects the torque converter output to the transmission 16. A transmission output shaft 28 connects the output of the transmission 16 to the auxiliary gearbox 18 or directly to the vehicle load 20, depending upon whether gearing in the auxiliary gearbox 18 is engaged. If gearing in the auxiliary gearbox 18 is engaged, then the output of the auxiliary gearbox 18 is supplied to the vehicle load 20 via an auxiliary gearbox output shaft 30.

In the transmission 16, gearing is selectively coupled between the input shaft 26 and the output shaft 28 by one or more torque transmitting mechanisms 48. The gearing generally includes a plurality of intermeshing gear sets that are concentric with and/or rotatable about one or more gear shafts, and may include one or more planetary gear sets. Alternatively or in addition, the gearing may include one or more chain-driven components. One example of a transmission including a planetary gear assembly is described in U.S. Pat. No. 4,070,927 to Polak. In general, the transmission 16 is shiftable to establish one of a number of selectable operating ranges or gear ratios, including, for example, one or more reverse ranges, one or more neutral ranges, and one or more forward ranges.

As illustrated, the auxiliary gearbox 18 is remotely mounted, e.g. coupled to the transmission 16 by the transmission output shaft 28. In other versions of the powertrain 10, the auxiliary gearbox 18 may be mounted directly to the transmission 16. The auxiliary gearbox 18 may share the same housing as the transmission 16, or the auxiliary gearbox housing may be separate from the transmission housing.

In the auxiliary gearbox 18, there are typically one or more sets of intermeshing gears, with each gear set including one gear that is selectively couplable to the transmission output shaft 28 and another gear that rotates with or about the auxiliary gearbox output shaft 30. An idler gear may be employed to alter the direction of rotation, for optimal output or other reasons. In some versions of the auxiliary gearbox 18, the gearing may include one or more chain-driven components, alternatively or in addition to the sets of gears.

The auxiliary box gearsets are selectively engageable by one or more torque transmitting mechanisms 54, to provide multiple alternative modes of operation to drive the vehicle load 20. The torque transmitting mechanisms 54 may include pneumatic, hydraulic, or mechanical devices, such as clutches, dogtooth rings, synchronizers and/or other suitable engaging mechanisms. In some embodiments, the auxiliary gearbox 18 may include an optional torque proportioning differential with a lockup clutch on the auxiliary gearbox output shaft 30.

In some versions, the auxiliary gearbox 18 provides a single alternate mode of operation rather than multiple alternate modes (e.g., one all-wheel drive mode or low-range gear rather than a choice of two-wheel drive and four-wheel drive modes or a choice of one or more low- and high-range gears).

In the examples described in this disclosure, the auxiliary gearbox 18 is a device commonly known as a transfer case or drop box, which has at least one low range gear (L) and at least one high range gear (H). Low ranges typically slow down the vehicle or are used when increased torque is needed, such as when the vehicle is being driven off-road or the vehicle needs to pull a heavy load. High ranges are typically used when the vehicle is traveling at higher speeds, without a heavy load, or on terrain that does not require as much effort to traverse (such as smooth, flat, paved highways). One example of an auxiliary gearbox is the 3700 SP transfer case, manufactured by Allison Transmission, Inc.

The output of the auxiliary gearbox 18 is applied to the vehicle load 20 by the auxiliary gearbox output shaft 30. A speed sensor 52 may be coupled to the auxiliary gearbox output shaft 30 to monitor its rotational speed. The vehicle load 20, schematically shown in FIG. 1, represents the mechanical components of the vehicle that are driven by the output of the transmission 16 and/or the auxiliary gearbox 18.

For example, in one operating mode, the transmission 16 outputs rotational energy to the transmission output shaft 28, and the auxiliary gearbox 18 applies the transmission output to both front and rear axles or drive shafts of the vehicle. In this case, the driven vehicle load includes all of the drive wheels of the vehicle. In another example, the transmission outputs rotational energy to the transmission output shaft 28, and/or to a power take-off assembly via the transfer case 18. In this example, the driven vehicle load may include the device connected to the power take-off assembly and/or the vehicle's drive wheels (although, in many instances, a power take-off device cannot be operated at the same time that the vehicle is in motion). Of course, while the preceding description refers to "drive wheels," any suitable traction or propulsion device may be used to drive or propel the vehicle having a powertrain such as the powertrain 10 incorporated therein.

The torque transmitting mechanisms 48, 54 are selectively engageable and disengageable to cause gearing in the transmission 16 (in the case of the torque transmitting mechanisms 48) or the auxiliary gearbox 18 (in the case of the torque transmitting mechanisms 54) to engage or release, in order to change the operational mode, range, or speed ratio of the transmission 16 or the auxiliary gearbox 18, as the case may be. As such, the torque transmitting mechanisms 48, 54 are configured to selectively achieve a mechanical, fluid or friction coupling between components of the transmission 16 or components of the auxiliary gearbox 18, as the case may be. The torque transmitting mechanisms 48, 54 may be friction devices or fluid-operated devices such as clutches or brake-type devices, and may be stationary- or rotating-type devices.

The operation of the torque transmitting mechanisms 48, 54 of the transmission 16 and the auxiliary gearbox 18, respectively, is controlled by a control system 22. In general, the control system 22 includes a supply of pressurized fluid (e.g. air or transmission oil and/or another hydraulic fluid), and a number of fluid passages and fluidically-actuated valving that are arranged to control the application and release of the torque transmitting mechanisms 48, 54 by selectively directing pressurized fluid to the torque transmitting mechanisms 48, 54.

The illustrated version of the control system 22 includes electro-hydraulic components, although other versions may include electro-pneumatic and/or electromechanical components. Some examples of electro-hydraulic control systems for vehicle transmissions are described in U.S. Patent Application Publication No. 2003/0114261 to Moorman, et al. and U.S. Pat. No. 5,601,506 to Long, et al.

Electromechanical actuators (not shown), such as on-off solenoids, variable output solenoids, or the like, are coupled to valving in the control system 22. The electromechanical actuators receive electrical signals from the transmission control unit 34. Certain of the electromechanical actuators may output fluid pressure (e.g. hydraulic or pneumatic) in response to electrical signals issued by the transmission control unit 34. The output of fluid pressure by the electromechanical actuators may cause one or more of the valves in the control system 22 to change position, thereby affecting the flow of fluid pressure to the torque transmitting mechanisms 48, 54. Typically, an increase in fluid pressure is used to engage a torque transmitting mechanism, while decreasing fluid pressure releases the torque transmitting mechanism.

The illustrated version of the control system 22 has a pair of subsystems 36, 38. The subsystem 36 is typically an electro-hydraulic system that controls hydraulically-controlled components of the torque converter 14 and the torque transmitting mechanisms 48 of the transmission 16. The subsystem 38 controls the torque transmitting mechanisms 54 of the auxiliary gearbox 18, and may include electro-hydraulic, electro-pneumatic, electromechanical elements, or any combination of electro/mechanical/hydraulic/pneumatic elements.

In the illustrated version, each of the subsystems 36, 38 has its own valving, fluid passages, and supplies of pressurized fluid. Therefore, each of the subsystems 36, 38 may operate independently of the other subsystem 36, 38. For example, the fluid supply for the subsystem 36 may include a hydraulic supply system (e.g. a pump, regulator valve, sump, and transmission oil), while the fluid supply for the subsystem 38 may include a pneumatic supply system (e.g. a pump, regulator, and air supply). In other versions, the subsystems 36, 38 may share a fluid supply (e.g. air or transmission oil) and/or one or more valves and fluid passages. Fluid supplies for the subsystems 36, 38 may be separated or combined for control advantages, lubrication, or other requirements of a particular design.

Operation of the control system 22 is controlled by the transmission control unit 34. In general, the transmission control unit 34 is made up of computer components and electrical circuitry, including an interface 70, one or more microprocessors or microcontrollers 72, and memory 74, which may be mounted to one or more substrates (e.g. printed circuit boards). The transmission control unit 34 may be implemented as multiple separate logical or physical structures or as a single unit, as will be appreciated by those skilled in the art. Typically, the transmission control unit 34 is enclosed in a housing and mounted to the vehicle near the transmission 16. The transmission control unit 34 may be located anywhere on the vehicle to control the control system 22, which may be enclosed in a housing commonly referred to as a valve body.

The transmission control unit 34 controls the operation of both the transmission 16 and the auxiliary gearbox 18, based on inputs from various components of the powertrain 10. Such inputs may include digital and/or analog signals received from one or more sensors 46, 50, 52, operator controls 24, or other electronic devices associated with the vehicle components.

The interface 70 facilitates electronic communication between the transmission control unit 34 and external devices such as the sensors 46, 50, 52. For example, the interface 70 may include signal processing and/or signal conditioning devices such as analog to digital converters, digital to analog converters, filters, and the like. Signals processed by the interface 70 are typically stored in the memory 74. The memory 74 also typically stores fixed and/or configurable parameters and computer-executable instructions. For example, shift schedules for the transmission 16 and the auxiliary gearbox 18 are stored in memory in the form of a database table, electronic file, or other suitable electronic data structure that enables data stored within it to be accessed by the computer-executable instructions.

The shift schedules for the transmission 16 and the auxiliary gearbox 18 define the conditions that indicate the need for an upshift or a downshift of the transmission 16 or the auxiliary gearbox 18. These shift schedules may take the form of electronic lookup tables, where each element in the lookup table defines the desired range of the transmission 16 and the auxiliary gearbox 18, for the given combination of row and column parameters. In other words, if one vehicle parameter has a value of x, and another parameter has a value of y, then the desired range of the transmission 16 and the auxiliary gearbox is "ta," where "t" indicates the transmission range and "a" represents the auxiliary gearbox range. Of course, it is possible that more (or less) than two parameters may be used to determine the desired transmission and auxiliary gearbox ranges. If more than two parameters are used, then the lookup table is expanded to include multiple dimensions, or multiple lookup tables are used. If less than two parameters are used, then the lookup table is reduced to one dimension, or fewer lookup tables may be used.

Some of the data and instructions stored in the memory 74 may be generated only for temporary use (e.g. while the vehicle is operating), and may be deleted once power to the transmission control unit 34 is turned off. Others of the data and instructions may be required to be used each time the vehicle is placed into operation, and thus may be required to remain stored in the memory 74 after the power to the transmission control unit 34 is turned off. Accordingly, the memory 74 typically includes a combination of volatile and non-volatile memory (e.g. random-access memory and read-only memory) devices. The transmission control unit 34 may draw electrical power from the vehicle's power supply (e.g. a battery) or may have its own on-board power supply and/or back-up power supply.

The micro 72 accesses data, parameters, and computer instructions stored in the memory 74, and issues electrical control signals to various components of the powertrain 10. More particularly, during operation of a vehicle having a powertrain configured in a similar fashion to the powertrain 10 described above, the micro 72 processes the inputs shown in FIG. 2, executes computer instructions that implement the steps shown in FIG. 3, and generates the outputs shown in FIG. 2, as described below.

The operator controls 24 may include electronic controls, such as electrical switches activated by buttons, keys, levers, or similar actuators, and/or mechanical controls, such as mechanical range shifters. In the case of electronic controls, the operator controls 24 may be in electronic communication with the transmission control unit 34. For example, if the vehicle operator activates an electrical switch to select a reverse range or a four-wheel drive mode, the operator control 24 may send an electrical control signal indicative of the requested shift to the transmission control unit 34 via the communication link 66.

In the case of a mechanical control, the operator control 24 is mechanically coupled to the component being controlled, rather than directly connected to the transmission control unit 34. For example, in the case of a manual range selector, a change in position of the range selector initiated by the vehicle operator may result in a change in the configuration of the control system 22 to route fluid pressure to the appropriate torque transmitting mechanism(s) as needed to accomplish the shift requested by the vehicle operator. A sensor, such as a pressure switch or similar device, may be coupled to the range selector or to one or more components of the control system 22, to send electrical signals to the transmission control unit 34 upon detecting changes in state of the hydraulic components. The transmission control unit 34 may use the output of these sensors for control or diagnostic purposes.

In FIG. 1, the linkages 26, 28, 30 each represent mechanical linkages (e.g. rotatable shafts) connecting mechanical components of the powertrain 10. It will be understood by those skilled in the art that each linkage 26, 28, 30 may, in practice, be made up of one or more mechanical couplings, or that a greater or fewer number of mechanical linkages may be provided, according to the requirements of a specific design.

Similarly, the linkages 40, 42, 44 each represent fluid passages connecting hydraulic components of the control system 22 to hydraulically-controlled components of the torque converter 14, transmission 16, and auxiliary gearbox 18. However, it will be understood by those skilled in the art that each linkage 40, 42, 44 may, in practice, be made up of one or more fluid couplings, or that a greater or fewer number of linkages may be provided, according to the requirements of a specific design.

Likewise, the linkages 58, 60, 62, 64, 66 each represent electrical connections connecting electrical and electronically-controlled components of the powertrain 10. The linkages 58, 60, 62, 64, 66 may include insulated wiring, wireless links, networked datalinks, or other suitable connections for executing computer instructions and exchanging data and communications among the electrical and electronically-controlled components of the powertrain 10. It will be understood by those skilled in the art that each linkage 58, 60, 62, 64, 66 may, in practice, be made up of one or more electrical couplings, or that a greater or fewer number of linkages may be provided, according to the requirements of a specific design.

Figures 2, 3:
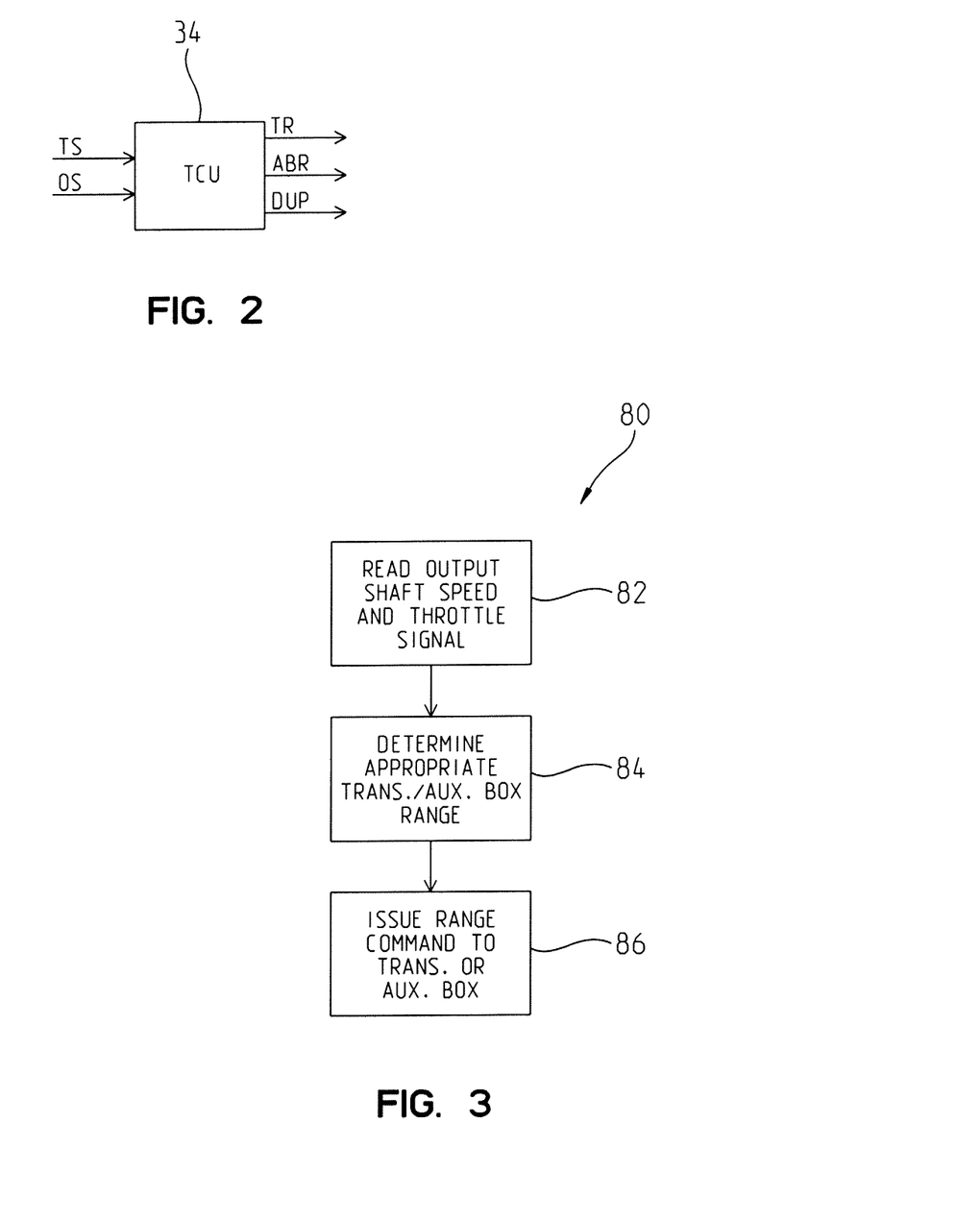
FIG. 2 is a flow diagram schematically illustrating inputs to and outputs from the transmission control unit of FIG. 1.
FIG. 3 is a flow diagram illustrating steps that are executable by the transmission control unit of FIGS. 1 and 2.

Referring to FIG. 2, the transmission control unit 34 receives a number of electrical inputs, including a throttle setting (TS) signal and an output speed (OS) signal. The TS signal indicates a current status of the vehicle's throttle. The vehicle's throttle status may be controlled by the vehicle operator (e.g. by depressing or releasing the accelerator pedal), or may be electronically controlled (e.g. by a cruise control system). In general, the value of the TS signal represents a current operator request relating to vehicle speed (e.g. increase, decrease, or no change) relative to the current vehicle speed.

The TS signal is detected by one of the sensors 46 (e.g. a position sensor), processed by the electronic control unit 32, and communicated to the transmission control unit 34 by the electronic control unit 32 via the electrical couplings 56, 58. Alternatively, the TS signal may be communicated by one of the sensors 46 to one or both the electronic control unit 32 and the transmission control unit 34 using a different electrical coupling, such as an electronic vehicle network. If the TS signal is accessible by the transmission control unit 34 via a vehicle network, then direct electrical communication between the electronic control unit 32 and the transmission control unit 34 may not be necessary.

The OS signal indicates the rotational speed of the transmission output shaft 28 or the rotational speed of the auxiliary output shaft 30, depending upon which of the shafts 28, is driving the vehicle load 20. Alternatively, both the speed of the transmission output shaft 28 and the speed of the auxiliary gearbox output shaft 30 may be communicated to the transmission control unit 34 (e.g. via the electrical couplings 60, 62 or other suitable coupling, such as a vehicle network), in which case the OS signal may have two components, or two different OS signals may be communicated to the transmission control unit 34. The speed of the transmission output shaft 28 is detected by one of the sensors 50 (e.g. a speed sensor). The speed of the auxiliary gearbox output shaft 30 is detected by one of the sensors 52 (e.g. a speed sensor).

The vehicle speed may be calculated based on the values of the TS signal and the OS signal or signals, using known algorithms. The current transmission range may be calculated from the OS signal that indicates the speed of the transmission output shaft using known algorithms. The current range of the auxiliary gearbox may be calculated from the OS signal that indicates the speed of the auxiliary gearbox output shaft using existing algorithms of a conventional type, or newly developed algorithms.

The transmission control unit 34 executes computer instructions embodying the integrated shift logic for the transmission 16 and the auxiliary gearbox 18, described below, and issues control signals to the subsystems 36, 38 of the control system 22 and, in some cases, to the drive unit 12. After executing computer logic to determine the next appropriate range for the transmission 16 and the auxiliary gearbox 18, the transmission control unit issues a transmission range (TR) command to the electro-hydraulic sub-system 36 and/or issues an auxiliary gearbox range (ABR) command to the electro-hydraulic sub-system 38. In some embodiments, the subsystems 36, 38 may be omitted or bypassed, and the TR and/or the ABR command may be issued to the appropriate torque transmitting mechanism(s) 48, 54 using I/O hardwires or I/O datalink messages. Also, in some embodiments, the ABR command may actuate the appropriate torque transmitting mechanism(s) 54 via a transmission power-take-off assembly. The transmission control unit 34 may also issue a drive unit power (DUP) command to the electronic control unit 32.

The TR command communicates the next appropriate range for the transmission 16 to the electro-hydraulic sub-system 36 via an electrical coupling (e.g. the coupling 64 or other suitable coupling, such as a vehicle network), if an upshift or downshift of the transmission 16 is required. Similarly, the ABR command communicates the next appropriate range for the auxiliary gearbox 18 to the subsystem 38, via an electrical coupling (e.g. the coupling 64 or other suitable coupling, such as a vehicle network), if an upshift or downshift of the auxiliary gearbox 18 is required.

The DUP command indicates a desired change in the operating state of the drive unit 12, which may facilitate the newly commanded upshift or downshift of the transmission and/or auxiliary gearbox, or may simply be desirable in view of the current operating conditions. For instance, the DUP command may request the electronic control unit 32 to increase or reduce the amount of fuel being delivered to the drive unit 12. The DUP command is communicated to the electronic control unit 32 via an electrical coupling (e.g. the coupling 58 or other suitable coupling, such as a vehicle network).

Referring to FIG. 3, one embodiment 80 of steps executable by the micro 72 to provide integrated transmission-auxiliary gearbox shift control is shown. The routine 82 receives and reads the TS and OS signals described above. Typically, the interface 70 performs the routine 82 and stores the values embodied in the TS and OS signals in the memory 74.

The routine 84 accesses the integrated shift schedules for the transmission 16 and the auxiliary gearbox 18 from the memory 74. Using the appropriate shift schedule based on the particular powertrain configuration or design, the routine 84 determines the next appropriate range or gear ratio for the transmission 16 and the auxiliary gearbox 18, based on the current values of the TS and OS signals.

For example, if the OS signal indicates a decreasing vehicle speed, and the TS signal indicates that the throttle position is high, the transmission control unit 34 may issue a downshift command to either the transmission 16 or the auxiliary gearbox 18, to maintain or increase the vehicle's tractive effort. Conversely, if the OS signal indicates an increasing vehicle speed, and the TS signal indicates that the throttle position is high, the transmission control unit 34 may issue an upshift command to either the transmission 16 or the auxiliary gearbox 18, to allow the vehicle speed to increase.

If the TS signal decreases, and the OS signal indicates that the vehicle speed is remaining relatively constant, the transmission control unit 34 may command an upshift by the transmission 16 or the auxiliary gearbox 18, to reduce the drive unit speed while maintaining the vehicle speed (to enhance fuel economy, reduce wear and tear on the drive unit, or for other reasons).

If the TS signal decreases, or begins to approach zero, and the OS signal indicates that the vehicle speed is decreasing, the transmission control unit 34 may issue a downshift command to the transmission 16 or the auxiliary gearbox 18, to maintain an appropriate drive unit speed, to be in an appropriate range should the operator request an increase in torque, or to be positioned in the correct range so that after the vehicle stops, it is in an appropriate range to start moving again.

An example of a number of possible shift schedules is shown in Table 1, below.

TABLE 1

|  | Config 1 | Config 2 | Config 3 | Config 4 | Config 5 | Config 6 | Config 7 | Config 8 | Config 9 | Config. 10 |
|---|---|---|---|---|---|---|---|---|---|---|
| TS/OS1 | 1L | 1L | 1L | 1L | 1L | 1L | 1L | 1L | 1L | 1L |
| TS/OS2 | 1H | 2L | 2L | 2L | 2L | 2L | 2L | 2L | 2L | 2L |
| TS/OS3 | 2H | 1H | 2H | 3L | 3L | 3L | 3L | 3L | 3L | 3L |
| TS/OS4 | 3H | 2H | 3H | 1H | 2H | 3H | 4L | 4L | 4L | 4L |
| TS/OS5 | 4H | 3H | 4H | 2H | 3H | 4H | 1H | 5L | 5L | 5L |
| TS/OS6 | 5H | 4H | 5H | 3H | 4H | 5H | 2H | 1H | 6L | 6L |
| TS/OS7 | 6H | 5H | 6H | 4H | 5H | 6H | 3H | 2H | 1H | 7L |

TABLE 1-continued

|   | Config 1 | Config 2 | Config 3 | Config 4 | Config 5 | Config 6 | Config 7 | Config 8 | Config 9 | Config. 10 |
|---|---|---|---|---|---|---|---|---|---|---|
| TS/OS8  | 7H | 6H | 7H | 5H | 6H | —  | 4H | 3H | 2H | 1H |
| TS/OS9  | —  | 7H | —  | 6H | 7H | —  | 5H | 4H | 3H | 2H |
| TS/OS10 | —  | —  | —  | 7H | —  | —  | 6H | 5H | 4H | 3H |
| TS/OS11 | —  | —  | —  | —  | —  | —  | 7H | 6H | 5H | 4H |
| TS/OS12 | —  | —  | —  | —  | —  | —  | —  | 7H | 6H | 5H |
| TS/OS13 | —  | —  | —  | —  | —  | —  | —  | —  | 7H | 6H |
| TS/OS14 | —  | —  | —  | —  | —  | —  | —  | —  | —  | 7H |

Table 1 illustrates a number of range combinations that are possible when the shift logic for the transmission 16 and the shift logic for the auxiliary gearbox 18 are integrated. Effectively, the auxiliary gearbox 18 can be used to increase the number of potential ranges that are available. Configuration 10 is an example in which the vehicle is permitted to have all seven forward ranges in each of the ranges of the auxiliary gearbox, for a total of 14 available ranges. Conversely, the number of available ranges can be limited by restricting the availability of the ranges of the auxiliary gearbox 18 to specific forward ranges of the transmission 16. Configuration 2 is an example in which the auxiliary gearbox 18 is permitted to shift into the low range only when the transmission 16 is in either the first or second forward range. Configuration 3 is an example in which the auxiliary gearbox 18 is not permitted to shift into the high range when the transmission 16 is in the first forward range. Configurations 4, 5, and 6 require the auxiliary gearbox 18 to be in the high range whenever the transmission 16 is in the fourth, fifth, sixth, or seventh forward range. Configurations 8, 9, and 10 allow the low range of the auxiliary gearbox 18 to be used in at least the first four forward ranges of the transmission 16. The configurations illustrated in Table 1 do not include all of the possible permutations, but illustrate some of the available shift patterns.

For each of the example configurations shown in Table 1, the numbers "1" through "7" represent individual forward ranges of the transmission (i.e. first forward range, second forward range, etc.), and the "H" and "L" designations represent high and low ranges of the auxiliary gearbox. It will be understood that a fewer or greater number of forward ranges, and/or high and low ranges, may be used according to the requirements of a given design.

In the first column of Table 1, each row represents a given combination of values or ranges of values for the TS signal and the OS signal. The combination of values that results in a shift of either the transmission 16 or the auxiliary gearbox may be different for each configuration. For example, in the example Configuration 1 (shown in the second column of Table 1), the TS/OS combination that results in the transmission being in range 1 and the auxiliary gearbox being in range L may be different than the TS/OS combination that results in the 1L range in the example Configuration 2.

The configurations shown in Table 1 are potential upshift schedules. For example, in Configuration 2, an upshift from the 2L range combination to the 1H range combination is possible, while in Configuration 4, an upshift from the 3L range combination to the 1H range combination is possible. The corresponding potential downshift schedules would be the inverse of the schedules shown in Table 1.

It should be noted that operation of a vehicle using the disclosed system may start in any range, with all higher ratio ranges being automatically commanded and automatically engaged, while lower ratio ranges may be manually commanded and automatically engaged.

In one embodiment, shown as Config 1 in Table 1, the shift schedule is configured so that the auxiliary gearbox 18 can only shift (e.g. from L to H) when the transmission 16 is in the first range. However, when the transmission 16 is in the first range, the torque converter clutch 15 may or may not be applied, depending on the shift logic specified for the torque converter clutch, which is also embodied in the integrated shift schedule. Depending on whether the auxiliary gearbox 18 is in L or H, the transmission 16 may need to shift from the first range to the second range before commanding the auxiliary gearbox 18 to shift. In this case, the integrated shift schedule enables the transmission control unit 34 to accomplish a double transition shift independently of or, alternatively, in coordination with, the shift strategy for the torque converter clutch 15.

In some embodiments, the routine 84 includes a subroutine (not shown), in which the transmission control unit 34 determines whether to engage or release the torque converter clutch 15, based on the current auxiliary gearbox range and the current transmission range.

Figure 4:
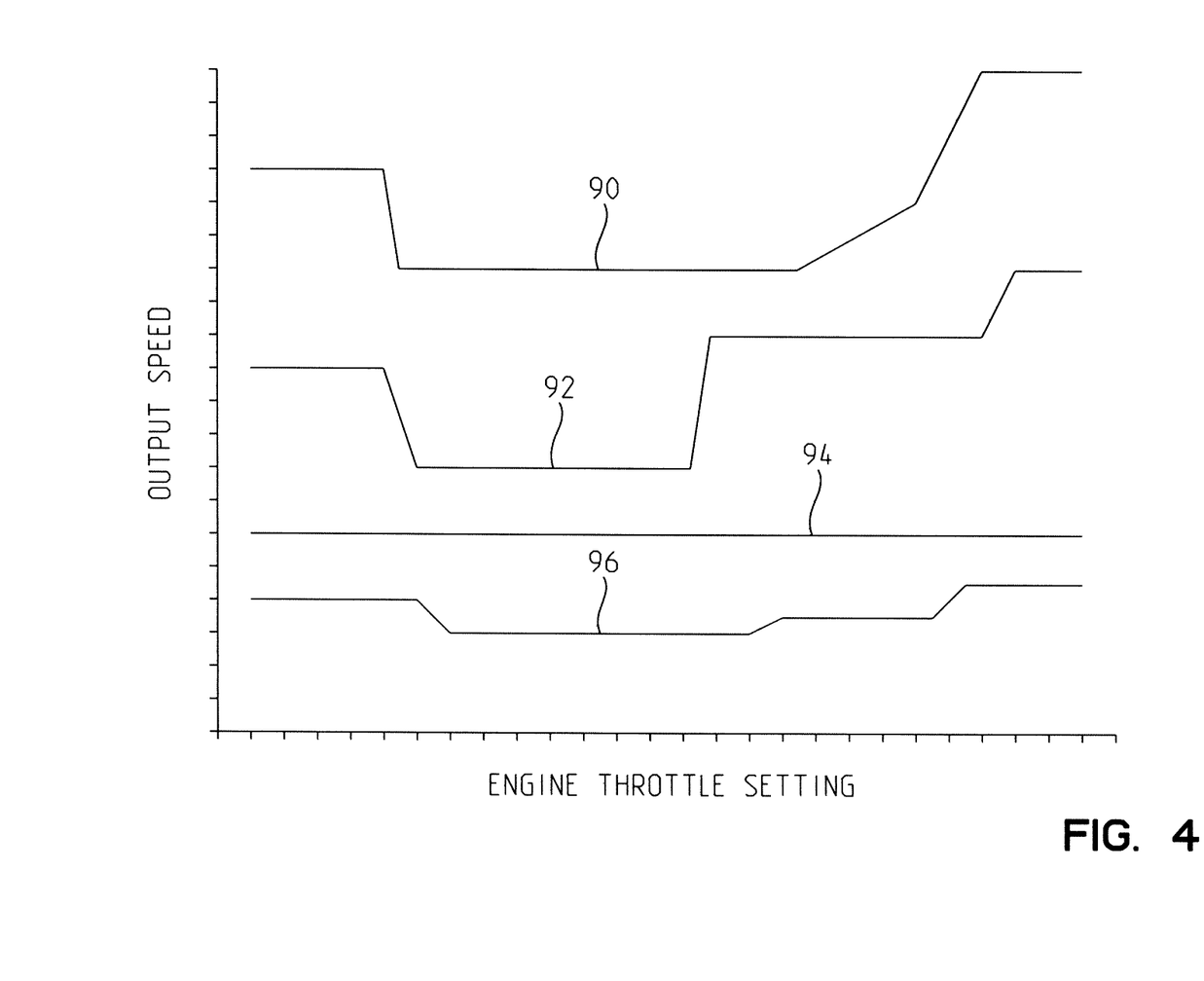
FIG. 4 is a plot illustrating one example of a transmission/auxiliary gearbox shift schedule.

FIG. 4 illustrates one example of a transmission and auxiliary gearbox shift schedule. Line 90 represents a transmission upshift, line 92 represents a transmission downshift, line 94 represents an auxiliary gearbox upshift, and line 96 represents an auxiliary gearbox downshift. The shift schedule or schedules used in a given implementation will depend on the actual gear ratios used and/or other specific aspects of the particular design.

In general, the transmission control unit 34 may be programmed with customized range selection criteria, which may depend on the specific gear ratios, geared speeds, clutch engagement mechanisms selected for the transmission 16 or the auxiliary gearbox 18, the vehicle type, the drive unit type, or other factors. The integration of the shift logic for the transmission 16 and the auxiliary gearbox 18 in the transmission control unit 34 effectively merges the transmission 16 and the auxiliary gearbox 18 into a single unit for purposes of shift control. This allows both the transmission 16 and the auxiliary gearbox 18 to be placed into an appropriate range for the current operating conditions, without further effort by the vehicle operator or otherwise. Such control also enables split shifting between the transmission 16 and the auxiliary gearbox 18, thereby effectively multiplying the number of usable ratios for vehicle performance or for other reasons.

Once the appropriate transmission range and auxiliary gearbox range have been determined, the routine 86 issues the TR command and the ABR command as described above.

Using input from one or more of the sensors 46, 50, 52, the transmission control unit 34 will perform monitoring and diagnostics tasks for the auxiliary gearbox 18 as well as the transmission 16. For example, the transmission control unit 34 may verify that the desired range has been attained by the auxiliary gearbox 18 by monitoring the auxiliary gearbox output speed sensor.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. A transmission assembly for a powered vehicle, comprising
   a transmission comprising first gearing and first selectively engageable torque transmitting mechanisms,
   an auxiliary gearbox coupled to the transmission and comprising second gearing and second selectively engageable torque transmitting mechanisms,
   a first speed sensor coupled to the transmission and configured to detect a speed of an output of the transmission,
   a second speed sensor coupled to the auxiliary gearbox and configured to detect a speed of an output of the auxiliary gearbox, and
   a control unit coupled to the transmission, the control unit having memory, processor circuitry, and executable routines stored in memory to receive electronic signals from the first and second speed sensors, determine whether the transmission needs to be shifted based on the electronic signals from the first and second speed sensors, determine whether the auxiliary gearbox needs to be shifted based on the electronic signals from the first and second speed sensors, and send a shift command to the auxiliary gearbox in response to a determination that the auxiliary gearbox needs to be shifted while the vehicle is in operation, independently of activity of the vehicle operator,
   wherein the transmission has a number of selectable forward ranges and the auxiliary gearbox has at least one selectable low range and at least one selectable high range, and the control unit prevents any upshift in the transmission when the auxiliary gearbox is in a range other than the high range.

2. The transmission assembly of claim 1, wherein the auxiliary gearbox is driven by the transmission.

3. The transmission assembly of claim 1, comprising a transmission output shaft having a first end and a second end spaced from the first end, wherein the first end is coupled to the transmission, and the auxiliary gearbox is coupled to the second end.

4. The transmission assembly of claim 1, comprising a shift schedule stored in the memory, wherein the shift schedule indicates shift commands for the transmission and shift commands for the auxiliary gearbox.

5. The transmission assembly of claim 4, wherein the shift schedule indicates shift commands for a torque converter clutch.

6. The transmission assembly of claim 1, comprising a hydraulic control system operably coupled to the transmission and a pneumatic control system operably coupled to the auxiliary gearbox.

7. The transmission assembly of claim 6, wherein the control unit sends a first shift command to the hydraulic control system to shift the transmission, and the control unit sends a second shift command to the pneumatic control system to shift the auxiliary gearbox.

8. The transmission assembly of claim 7, comprising a first supply of fluid coupled to the hydraulic control system and a second supply of fluid coupled to the pneumatic control system.

9. An electronic control for a transmission for a powered vehicle, the transmission having an auxiliary gearbox coupled thereto, the electronic control comprising
   a housing coupled to the transmission, and
   a control unit supported by the housing, the control unit having an interface, memory, processor circuitry, a shift schedule stored in the memory, the shift schedule indicating shift commands for the transmission and shift commands for the auxiliary gearbox, executable routines stored in the memory, the interface being configured to receive electrical inputs from the transmission and the auxiliary gearbox, the processor circuitry being configured to execute the executable routines to determine a transmission range including a first plurality of gear ratios based on at the electrical inputs from the transmission and the auxiliary gearbox, issue an electrical transmission range command to the transmission, determine an auxiliary gearbox range including a second plurality of gear ratios based on the electrical inputs from the transmission and the auxiliary gearbox, and issue an electrical auxiliary gearbox range command to the auxiliary gearbox while the vehicle is in operation, without initiation by the vehicle operator.

10. The electronic control of claim 9, comprising a control system configured to control application and release of hydraulically-controlled components of the transmission and pneumatically-controlled components of the auxiliary gearbox, wherein the processor circuitry issues electrical signals to the control system to control the pneumatically-controlled components of the auxiliary gearbox.

11. The electronic control of claim 9, wherein the transmission has a number of selectable forward ranges and the auxiliary gearbox has at least one selectable low range and at least one selectable high range, and the control unit prevents any upshift in the transmission when the auxiliary gearbox is in a range other than the high range.

12. The electronic control of claim 9, wherein the transmission has a number of selectable forward ranges and the auxiliary gearbox has at least one selectable low range and at least one selectable high range, and the control unit prevents any downshift in the auxiliary gearbox when the transmission is in a range other than a first forward range.

13. The electronic control of claim 9, wherein the transmission has a number of selectable forward ranges and the auxiliary gearbox has at least one selectable low range and at least one selectable high range, and the control unit prevents any shifting between the high and low ranges of the auxiliary gearbox when the transmission is in a range other than any of the forward ranges.

14. The electronic control of claim 9, wherein the transmission has a number of selectable forward ranges and the auxiliary gearbox has at least one selectable low range and at least one selectable high range, and the control unit prevents the transmission from shifting among the forward ranges when the auxiliary gearbox is in a range other than either a low range or a high range.

15. A method executable by an electronic control system mounted to a transmission of a powered vehicle while the vehicle is in operation, the method comprising
   receiving a transmission output speed signal from a first speed sensor coupled to the transmission, receiving an auxiliary gearbox output speed signal from a second speed sensor coupled to an auxiliary gearbox, the auxiliary gearbox being coupled to the transmission, determining a transmission range including a first plurality of gear ratios based on the transmission output speed signal and the auxiliary gearbox output speed signal, issuing a transmission range command to the transmission to cause the transmission to attain the transmission range, determining an auxiliary gearbox range including a second plurality of gear ratios based on the transmission output speed signal and the auxiliary gearbox output speed signal independently of activity of the vehicle operator, and issuing an auxiliary gearbox range command to the auxiliary gearbox to cause the auxiliary gearbox to attain the auxiliary gearbox range.

16. The method of claim 15, comprising receiving a throttle signal from an electronic control unit mounted to a drive unit of the vehicle.

17. The method of claim 15, comprising determining a transmission range based on a current auxiliary gearbox range.

18. The method of claim 15, comprising determining an auxiliary gearbox range based on a current transmission range.

19. The method of claim 15, comprising determining whether to engage or release a torque converter clutch of the vehicle based on the auxiliary gearbox range.

20. The method of claim 15, comprising restricting shifting of the transmission based on a current auxiliary gearbox range.

* * * * *